G. C. PHILLIPS.
Steam-Packing.
No. 216,451. Patented June 10, 1879.
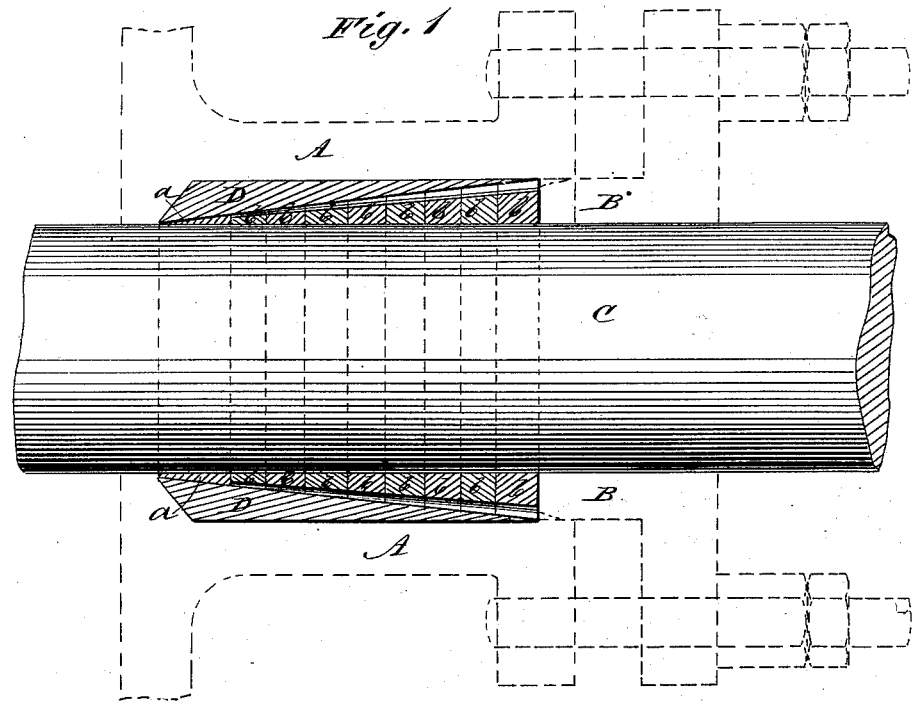
Fig. 4     Fig. 2     Fig. 3
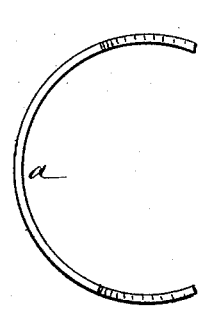 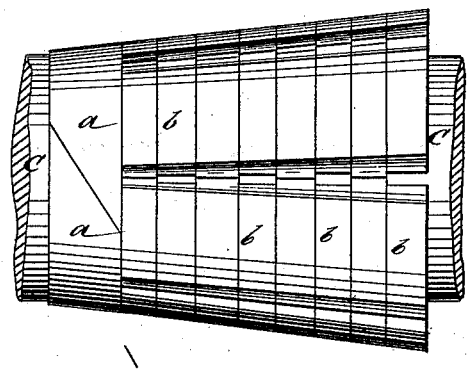 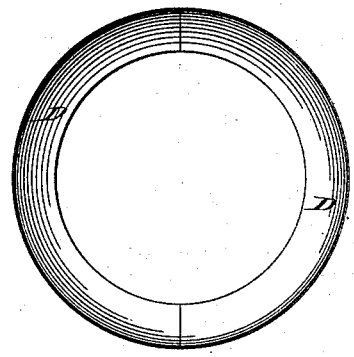
Fig. 5
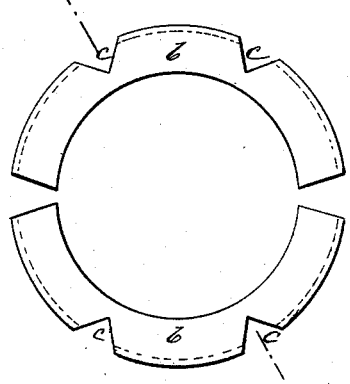
WITNESSES:
C. Neveux
C. Sedgwick
INVENTOR:
G. C. Phillips
BY
ATTORNEYS.

UNITED STATES PATENT OFFICE.

GEORGE C. PHILLIPS, OF SILVER CITY, ASSIGNOR TO HIMSELF AND W. D. BRAY, OF GOLD HILL, NEVADA.

IMPROVEMENT IN STEAM-PACKINGS.

Specification forming part of Letters Patent No. 216,451, dated June 10, 1879; application filed April 11, 1879.

*To all whom it may concern:*

Be it known that I, GEORGE C. PHILLIPS, of Silver City, in the county of Lyon and State of Nevada, have invented a new and Improved Steam-Packing, of which the following is a specification.

The object of this invention is to furnish a metal packing for stuffing-boxes of steam-cylinders, air-engines, &c., which will form a tight joint, and is susceptible of being contracted around the rod and in the stuffing-box until worn out, and is also adapted to resist fusion under the heat of steam.

The invention consists in making segmental packing-rings with recesses in their periphery, as hereinafter described.

In the accompanying drawings, Figure 1 is a longitudinal section of a stuffing-box and gland with the improved packing. Fig. 2 represents the packing-rings on the rod; Fig. 3, the conical sleeve; Fig. 4, the bottom ring, and Fig. 5 a front view of the rings.

Similar letters of reference indicate corresponding parts.

Referring to the drawings, A represents the stuffing-box. B is the gland or follower, and C is the piston-rod. D is the sleeve, with a cylindrical periphery and a conical bore, and having its inner end beveled to adapt it to fit closely the conical or dished bottom of the stuffing-box, as shown.

The exterior diameter of the sleeve equals that of the stuffing-box, while the interior at the inner end is nearly the same as the rod, and thence widens to that of the stuffing-box at the exterior end. The sleeve is also, preferably, divided equally longitudinally, as shown in Fig. 3, to adapt it to be placed over the rod and within the box.

The bottom packing-ring, $a$, has a conoidal exterior and a cylindrical interior, and fits closely between the bottom or end of the sleeve and the rod. It is divided into two equal parts by diagonal lines or cuts, and at its inner end is so thin as to be able to pass out between the sleeve and rod when pressed upon from the outside by the gland.

The packing-rings $b\ b$, &c., are of the same form as $a$, but are not complete semicircles, space being left to contract them toward the bottom, the ends being chamfered in opposite directions to enable them to come together evenly and without obstruction, while the rings are enlarged in exterior diameter to the end of the sleeve, where the conical end of the follower bears upon the last one.

The peripheries of the segmental rings $b$ are provided with notched recesses $c$, in which the water from the condensed steam collects, and thus prevents them from fusing under the excessive heat of the steam.

The operation of the invention can be readily understood from the drawings. By the screwing in of the follower the rings are crowded between the sleeve and the rod, and thus made to maintain a steam-tight joint.

Having thus described my invention, I claim as new and desire to secure by Letters Patent—

The recesses $c$ in the peripheries of the segmental packing-rings $b$, to receive the water from the condensed steam for the purpose of preventing the heat from the steam from fusing the soft metal of the rings, substantially as described.

GEO. CROWAN PHILLIPS.

Witnesses:
A. A. BOWLAND,
JNO. W. GRIER.